United States Patent [19]
Zierler

[11] Patent Number: 6,156,128
[45] Date of Patent: Dec. 5, 2000

[54] PROCESS AND APPARATUS FOR WASHING CONTAMINATIONS FROM MATERIAL RETAINED ON A TRASH RAKE

[75] Inventor: Franz Zierler, Bad Ischl, Austria

[73] Assignee: ABZ Zierler Ges. m.b.H. & Co. KG, Bad Ischl, Austria

[21] Appl. No.: 09/367,160

[22] PCT Filed: Jan. 27, 1998

[86] PCT No.: PCT/AT98/00015

§ 371 Date: Aug. 9, 1999

§ 102(e) Date: Aug. 9, 1999

[87] PCT Pub. No.: WO98/34731

PCT Pub. Date: Aug. 13, 1998

[30] Foreign Application Priority Data

Feb. 10, 1997 [AU] Australia .................................. 202/97

[51] Int. Cl.⁷ .................................. B08B 1/02; B08B 3/02
[52] U.S. Cl. .................................. 134/16; 134/10; 134/13; 134/25.1; 134/25.5; 134/26; 134/32; 134/65; 134/70
[58] Field of Search ................................. 134/13, 10, 16, 134/25.1, 25.5, 26, 32, 65, 70

[56] References Cited

U.S. PATENT DOCUMENTS 3,544,369  12/1970  Keogh, Jr. .................................. 134/13
5,641,360   6/1997  Bischof .................................. 134/10

FOREIGN PATENT DOCUMENTS

| 37 15 019 | 11/1988 | Germany . |
| 40 42 167 |  7/1991 | Germany . |
| 91 09 180 | 11/1991 | Germany . |
| 42 11 657 |  7/1993 | Germany . |

*Primary Examiner*—Zeinab El-Arini
*Attorney, Agent, or Firm*—Collard & Roe, P.C.

[57] ABSTRACT

Material retained on a trash rake is washed in a washing chamber by compacting the material before it enters the washing chamber with a screw conveyor passing horizontally through the washing chamber, injecting washing water into the washing chamber until the washing water has reached a level determined by the material in the washing chamber to loosen and wash the compacted material to wash out contaminations, draining the washing water and the contaminations through a screen from the washing chamber to dewater the material, and discharging the dewatered compacted material from the washing chamber. To assure advantageous washing conditions, the injection of washing water is periodically discontinued to lower the level of the washing water filling the washing chamber periodically from this level to a residual level sufficient to ensure discharge of the material from the washing chamber.

7 Claims, 2 Drawing Sheets

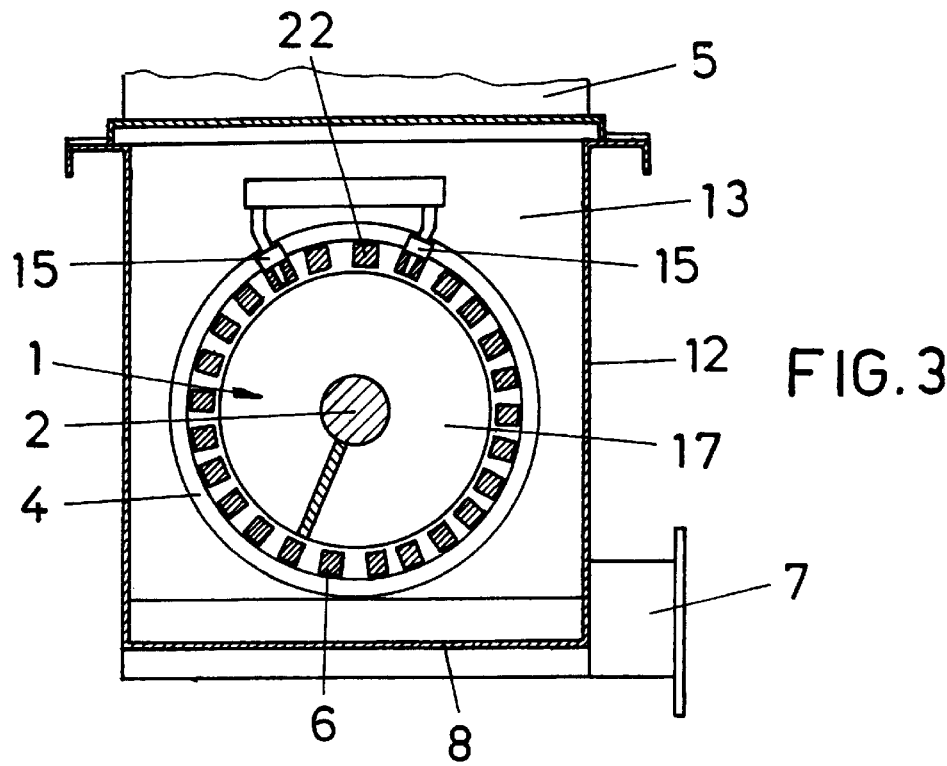
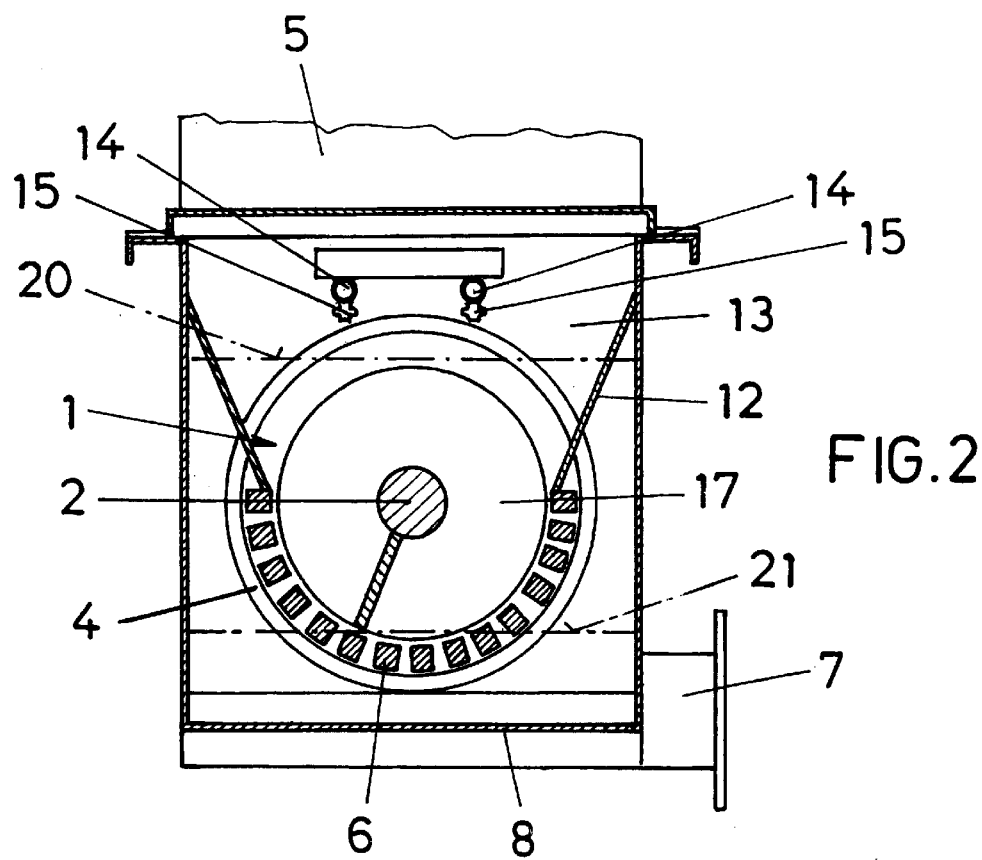

PROCESS AND APPARATUS FOR WASHING CONTAMINATIONS FROM MATERIAL RETAINED ON A TRASH RAKE

This is a national stage application of PCT/AT 98/00015 filed Jan. 27, 1998.

The invention relates to a process for washing material retained on trash rakes, which is compacted before it enters the washing chamber with the help of a screw conveyor extending horizontally through a washing chamber, loosened up in the washing chamber and washed with injected washing water, and then discharged under compacting and dehydrating from the washing chamber, from which the washing water with the washed-out contaminations is drained through a screen insert. The invention, furthermore, relates to a device for carrying out the process.

In order to wash out the organic component from the material retained on the trash rake of water treatment plants, it is known (from DE 42 11 657 C1) to compact the material retained in the trash rake with the help of a horizontal screw conveyor before it enters into a washing chamber, because by compacting the material retained in the trash rake with the help of a conveyor screw, especially the feces components are mixed with the other trash materials, and kneaded and ground in this mixing process in such a way that effective breaking up and crushing of the coarse feces components is ensured as a precondition for largely washing said organic substances out in the course of the subsequent washing process. In the washing chamber, the waste material treated in said way, which may be additionally loosened up by loosening wings of the conveyor screw, if need be, is rinsed with injected washing water, whereby it is made sure that the filling level of the water will not completely cover the waste material, so that the washing water directly injected onto part of the waste material, which is circulated by the slowly revolving conveyor screw. Following said two-stage washing zone with different water filling levels, the waste material is then dehydrated, whereby the washed-out organic substances are drained with the washing water via screen inserts and returned to the waste water treatment plant. The washed trash material is then dehydrated, compacted and discarded. In spite of the costly two-stage washing process, the washing result remains unsatisfactory because the discharged, washed trash material still contains a component of organic substances that is not at all negligible.

Therefore, the invention is based on the problem of developing a process for washing materials retained in a trash and waste collecting rake of the type described above, in such a way that the result of the washing process can be substantially improved with simple means.

Said problem is solved by the invention in that by periodically interrupting the feed of washing water into the washing chamber, the water filling level in said washing chamber is periodically lowered from a backup level periodically occurring prior to such interruption depending on the amount of raked-in trash and waste in said washing chamber, at least to a residual level ensuring adequate removal of the trash and waste materials from said chamber.

Extensive tests have shown that the organic components, which amount to a major part of the raked-in trash and waste materials, can be separated reliably from the other solid materials only if the raked-in trash and waste materials are subjected to a suitably long washing process in an adequate amount of washing water. This requires as a precondition that the level of the washing water in the washing chamber is suitably high. However, efficient transport of the raked-in trash and waste materials through the washing chamber is obstructed by such a suitably high washing water filling level because of the comparatively slow rotation of the screw conveyor. The feed of washing water is periodically discontinued for this reason, so that the filling level of washing water is lowered to at least a residual level permitting the raked-in trash and waste materials to be conveyed as required. Backing up of the washing water from the residual level after the feed of washing water has been restarted, furthermore, causes washing water to be sprayed directly onto the raked-in materials until such materials are covered with water, which supports the washing process. Therefore, advantageous washing conditions can be assured overall, leading to a high degree of washout of the raked-in material without having to fear unnecessary crushing of the inorganic solid components contained in the raked-in trash and waste. As draining of the washing water through the screen insert within the zone of the washing chamber is dependent upon the amount of raked-in material present at the given time, such material clogging part of the screen insert, the filling level of the washing water is automatically adapted to the given through-put of raked-in trash and waste material if the feed rate of the washing water is coordinated with the possible drain rate through the unobstructed screen insert because greater amounts of raked-in trash and waste in the washing chamber ensue higher washing water backup levels between the draining steps.

The process can be carried out based on a device with a horizontal screw conveyor. The housing of said screw conveyor forms a washing chamber arranged between two compacting sections. Said washing chamber is equipped with spray nozzles which are connectable to a washing water supply, and with at least one screen insert for draining washing water when the spray nozzles are periodically actuated via a control device.

On condition that the feed of washing water via the spray nozzles is selected adequately greater than the drain of washing water through the screen insert, the washing water in the washing chamber can be backed up by turning on the spray nozzles until the latter are switched off again. With suitable coordination between the feed and drain rates of the washing water, this assures that an adequate amount of washing water is available—such quantity being adapted to the given rate of through-put of trash and waste materials—in order to eddy the trash and waste material within a bath of washing water in a way advantageous to the separation of the organic components from the other, solid materials in the raked-in material, with continual discharge of part of the washed-out organic components with the washing water being drained. The largely complete discharge of the washed-out components takes place while the feed of washing water is discontinued and in the course of the subsequent dehydration of the remaining raked-in material.

In order to achieve good decomposition of the organic components of the raked-in material as the latter is being compacted upstream of the washing chamber, the compacting section of the screw conveyor located upstream of the washing chamber can be limited against the latter by an elastic apron supporting the build-up of dynamic pressure accordingly, because the plug of raked-in
   material developing upstream of such apron is expected to
     prevent undesirable drainage of washing water from the
     washing chamber as well, among other things. The
     raked-in trash and waste material received in the washing chamber via the elastic apron has to be loosened as
     directly as possible as it enters the washing chamber,
     which can be accomplished with the help of loosening wings on the screw conveyor. Particularly favorable conditions can be obtained in this connection if the washing chamber is equipped with washing nozzles aimed at the inlet zone where the raked-in material enters the washing chamber, so that the material entering the washing chamber is whirled in eddies and penetrated by the washing water.

As stated earlier, a sufficiently large volume of washing water enhances the washout process. So that a correspondingly large washing chamber is available within the zone of the housing of the screw conveyor, the washing chamber may have a section expanding the housing of the screw conveyor upwardly. However, such a widened section of the housing may impair the conveying efficiency of the screw conveyor under certain circumstances. For this reason, the screw conveyor may be limited versus the upwardly expanding section of the washing chamber by a screen part that permits passage of the washing water with the washed-out inorganic components, but retains the other solid materials within the conveying zone of the screw conveyor. So that apertures of the screen of the screen part limiting the expanded section of the washing chamber versus the screw conveyor do not have to be blocked by spray nozzles directed at the screw conveyor, said screen part itself may have the spray nozzles, which then extend through the bars of the screeen or the like. Furthermore, particularly if raked-in trash and waste materials are collected in greater quantities, and the screen parts or screen inserts are blocked accordingly, excess pressure can be built up in the screw housing by the spray nozzles feeding into the latter.

BRIEF DESCRIPTION OF THE DRAWINGS

The process as defined by the invention is explained in greater detail with the help of the drawing, in which:

FIG. 2 shows a cross section through said device according to line II—II in FIG. 1 on a larger scale, and FIG. 3 is a representation of a design variation of the device as defined by the invention corresponding with FIG. 2.

DETAILED DESCRIPTION OF PREFERRED EMBODIMENTS

Figure 1:
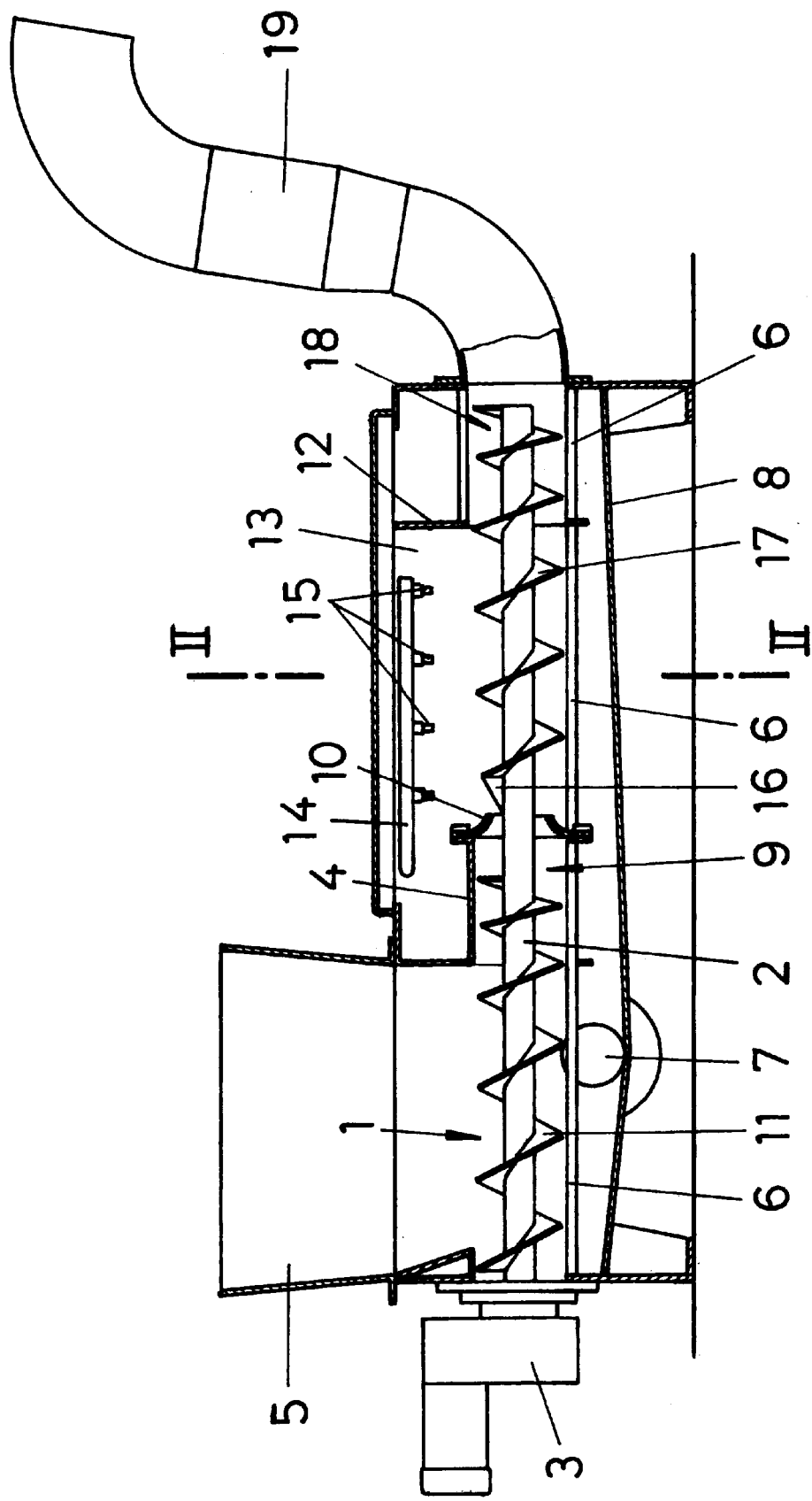
FIG. 1 is a simplified longitudinal section through a device as defined by the invention for washing material retained in trash-collecting rakes.

The shown device for washing material retained on or in the trash and waste rake has a screw conveyor 1 with a horizontal screw shaft 2, which is driven via a geared motor 3. Housing 4 of said screw conveyor 1 widens on the feed side into a feed chamber 5, via which the raked-in material to be washed is charged in screw conveyor 1. The bottom of the tubular housing 4 is equipped with a screen insert 6, which, according to the exemplified example, extends over the axial length of screw conveyor 1. Below said screen insert 6, provision is made for a collecting tub 8 for collecting the washing water draining from screw housing 4, said tub being connected with a washing water drain 7.

The material raked in is dropped into feed chamber 5 and compacted by screw conveyor 1 in a housing section 9, which is limited in the direction of conveyance by an elastic apron 10. As shown in FIG. 1, the screw spiral 11 on the feed side ends after a reduction in the height of the spiral in the zone of housing section 9 in order to ensure efficient compacting of the raked-in material. Following housing section 9, screw shaft 2 penetrates a washing chamber 12 having a section 13 expanding housing 4 of screw conveyor 1 upwardly. Spray bars 14 with spray nozzles 15 for the washing water are arranged in said section 13. The spray nozzles 15 located adjacent to housing section 9 are directed in this layout against the passage covered by the elastic apron 10. Following said passage, screw shaft 2 supports the loosening wings 16, which are followed by a screw spiral 17 ending in a housing section 18 bordering on washing chamber 12, where the washed material collected in the rake is dehydrated and compacted and then discharged by way of a rising discharge tube 19.

The material collected in the rake and conveyed via the elastic apron 10 into washing chamber 12, which was then broken up with respect to its organic components when it was compacted, is intimately mixed upon entry into the washing chamber 12 with the washing water injected via spray nozzles 15, and put into an eddying motion with the cooperation of loosening wings 16, so that the organic components ground up in the compacting process can easily detach themselves from the other solid components in order to be discharged with the washing water via screen insert 6. As opposed to conventional washers for washing materials retained in rakes, the present process is carried out with a varying washing water filling level in washing chamber 12, because washing and flooding the organic components out of the material can be carried out particularly efficiently if the raked-in material is circulated in a comparatively large volume of washing water. For this purpose, the washing water is backed up in washing chamber 12 with open spray nozzles 15, for example to a backup level 20 covering the screw conveyor 1 as indicated in FIG. 2. Such a backup level 20, however, impedes the discharge of the raked-in material because screw shaft 20 is driven only with a comparatively low rotational speed. For this reason, the filling level of the washing water has to be lowered at least to a residual level 21 permitting adequate conveyance of the washed material. The filling level of the washing water is lowered by discontinuing the feed of washing water, i.e., by shutting down the spray nozzles 15, so that the washing water with the washed-out organic components contained therein flows through screen insert 6 and via collecting tub 8 to washing water drain 7 and out of washing chamber 12. As the level of the washing water drops, the washed material is increasingly conveyed into housing section 18 in order to be dewatered and compacted in said section. By filling washing chamber 12 up again with washing water, the following material is washed in the same way. Filling washing chamber 12 up again with washing water naturally requires that substantially more washing water is fed into the chamber than can drain via screen insert 6. The periodic filling and draining of washing chamber 12 can be carried out in a simple way through timed control of the spray nozzles 15, whereby it is possible to achieve automatic adaptation of the backup level to the given through-put of raked-in material. However, controlling the spray nozzles in dependence upon the filling level of the washing water in the washing chamber is possible also if exceeding of a presettable highest or falling short of a presettable lowest washing water filling level is monitored.

FIG. 2 shows that if the filling level of the washing water is adequately high, the material being processed can freely exit into the upwardly expanding section 13 of the washing chamber. In order to prevent such exiting especially of the inorganic component of the raked-in material from the immediate zone of screw conveyor 1, it is possible according to FIG. 3 to delimit screw conveyor 1 versus the widening section 13 of washing chamber 12 by a screen part 22. In such a case, it is recommended to install the spray nozzles 15 in screen part 22, as indicated in FIG. 3. If screen part 22 or screen insert 6 is partially clogged by the material being processed, an excess pressure advantageously promoting the washing of the material can be generated in housing 4 via said spray nozzles 15 feeding in the zone of screw housing 4.

What is claimed is:

1. A process of washing material retained on a trash rake in a washing chamber, comprising the steps of (a) compacting the material before it enters the washing chamber with a screw conveyor passing horizontally through the washing chamber;

(b) injecting washing water into the washing chamber until the washing water has reached a level determined by the material in the washing chamber to loosen and wash the compacted material to wash out contaminations;

wherein the injection of washing water is periodically discontinued to lower the level of the washing water filling the washing chamber periodically from said level to a residual level sufficient to ensure discharge of the material from the washing chamber;

(c) draining the washing water and the contaminations through a screen from the washing chamber to dewater the material; and (d) discharging the dewatered compacted material from the washing chamber.

2. An apparatus for washing material retained on a trash rake in a washing chamber, comprising (a) a housing defining the washing chamber;

(b) a horizontal screw conveyor in the housing, the screw conveyor forming a compacting section upstream of the washing chamber for compacting the material and another compacting section downstream of the washing chamber, the washing chamber being arranged therebetween;

(c) spray nozzles connectable to a washing water source for injecting washing water into the washing chamber until the washing water has reached a level determined by the material in the washing chamber to loosen and wash the compacted material to wash out contaminations;

(d) a controlling device for periodically actuating the spray nozzles to discontinue the injection of washing water periodically to lower the level of the washing water filling the washing chamber periodically from said level to a residual level sufficient to ensure discharge of the material from the washing chamber;

(e) a screen for draining the washing water and the contaminations from the washing chamber to dewater the material; and (f) means for discharging the dewatered material from the other compacting section.

3. The apparatus of claim 2, further comprising an elastic apron separating the upstream compacting section from the washing chamber.

4. The apparatus of claim 3, wherein the washing chamber has an inlet zone adjacent the elastic apron for feeding the material into the washing chamber, and some of the spray nozzles are directed at the inlet zone.

5. The apparatus of claim 2, wherein the housing comprises an upwardly widening section for receiving the material.

6. The apparatus of claim 5, further comprising a screen part separating the upwardly widening housing section from the screw conveyor.

7. The apparatus of claim 6, wherein the screen part carries the spray nozzles.

* * * * *

UNITED STATES PATENT AND TRADEMARK OFFICE
CERTIFICATE OF CORRECTION

PATENT NO. : 6,156,128
DATED : December 5, 2000
INVENTOR(S) : Franz Zierler

It is certified that error appears in the above-identified patent and that said Letters Patent is hereby corrected as shown below:

<u>Title page,</u>
Column 1, item [30], please change to:

-- Feb. 10, 1997 [AT] Austria .............A 202/97 --

Signed and Sealed this

Thirtieth Day of October, 2001

Attest:

*Nicholas P. Godici*

NICHOLAS P. GODICI
*Attesting Officer*    *Acting Director of the United States Patent and Trademark Office*